United States Patent Office 3,112,303
Patented Nov. 26, 1963

3,112,303
WATER-INSOLUBLE AZO DYESTUFF
Charles G. Inman, Fort Edward, N.Y., assignor to Hercules Powder Company, Wilmington, Del., a corporation of Delaware
No Drawing. Filed Mar. 14, 1963, Ser. No. 265,074
1 Claim. (Cl. 260—193)

This invention relates to a new water-insoluble azo dyestuff which has exceptionally high resistance to bleeding in various organic media, such as lard oil and hot dairy wax, and which is, therefore, especially useful as a pigment for printing inks and plastic films in cases where contact with such organic media may occur.

Essentially all commercially important yellow azo pigments below to either the so-called Benzidine Yellow class, members of which are prepared by tetrazotizing 3,3'-dichlorobenzidine and coupling with a monoacetoacetarylide, or to the so-called Hansa Yellow class, members of which are prepared by diazotizing aniline derivatives and coupling with an acetoacetarylide. In general, the Benzidine Yellows have lower solubility in organic media than the Hansa Yellows. However, even the Benzidine Yellows show considerable bleeding in hot dairy wax and in lard oil. The solubility in hot dairy wax is particularly objectionable in cases where milk cartons on which printing has been done with inks containing yellow azo pigments are coated by dipping into baths of molten dairy wax. The solubility of the pigment is sufficient to cause discoloration of the bath wax with the result that the wax must be changed after a certain period of use. The wax solubility of Benzidine and Hansa Yellow pigments is also troublesome if these pigments are used for printing on food wrappers which are subsequently waxed and heat sealed. The solubility of yellow azo pigments in organic media also limits their use in the pigmentation of plastic films which are to come in contact with certain foodstuffs. For example, the tendency of yellow azo pigments to bleed in lard oil restricts their use in pigmenting plastic films, such as polyethylene and polypropylene films, which are to be used as bread wrappers. The lard oil on the bread can dissolve sufficient yellow azo pigment from the film to cause a perceptable strain on the bread surface.

It is the principal object of this invention to provide from readily available intermediates a new azo pigment of a desirable greenish-yellow hue having resistance to bleeding in hot dairy wax and in lard oil far superior to that exhibited by the commercially important Benzidine and Hansa Yellows.

In accordance with the present invention, the above and other objects are accomplished by the provision of a novel compound having the following chemical structure:

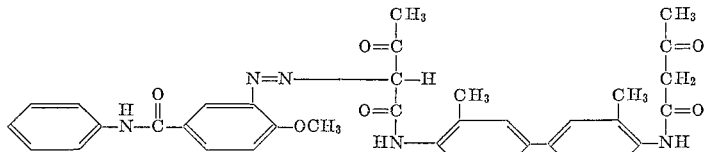

The novel compound of this invention is prepared by coupling diazotized 3-amino-4-methoxybenzanilide with 4,4'-bi-o-acetoacetotoluidide in the ratio of one mole of diazotized amine to one mole of biacetoacetarylide. The preparation of this pigment can be carried out in the manner described in Example 1 or in any other suitable manner.

The following examples will illustrate one method of preparing this pigment and will show its unusually high resistance to bleeding in organic media. The parts given are parts by weight.

Example 1

3-amino-4-methoxybenzanilide was diazotized in the following manner: 12.1 parts of 3-amino-4-methoxybenzanilide were stirred overnight with 100 parts of water. 200 parts of water and 19.8 parts of 29.3% hydrochloric acid were then added and the agitated slurry heated to 60° C. The slurry was next cooled to 5° C. by addition of ice and 3.6 parts of sodium nitrite in 30 parts of cold water then introduced. The slurry was stirred for 45 minutes at 9° C. and the excess nitrite then removed by adding small quantities of sulfamic acid.

20.0 parts of 4,4'-bi-o-acetoacetotoluidide were dissolved in 150 parts of water, containing 5.0 parts of sodium hydroxide, at 50° C. This acetoacetarylide solution was then added to a solution of 13.5 parts of anhydrous sodium acetate in 400 parts of water and the resulting solution diluted with water to 790 parts at 40° C. Acetic acid was added to bring the pH of the solution to 8.0, and 1.8 parts of lauryl pyridinium chloride dissolved in 40 parts of water were then introduced.

The coupling was effected by adding the diazo solution over one hour to the arylide suspension under agitation and maintained at 40° C. The resulting color slurry was stirred at 40° C. until the coupling was complete, as indicated by a negative reaction of a sample of the slurry with H-acid (1-amino-8-naphthol-3,6-disulfonic acid). The color slurry was then heated to the boil at the rate of 1° C. per minute, filtered, and the pigment filter cake washed thoroughly with water and dried at 180° F.

The resulting pigment was soft in texture and possessed a desirable greenish-yellow hue.

Example 2

The pigment prepared in Example 1 was tested for bleed in hot dairy wax by the following procedure:

2.7 grams of the pigment were ground with 22.5 grams of a commercial water flexographic ink vehicle and 2.1 grams of water until the pigment was thoroughly dispersed. The resulting ink was applied with a drawout knife to heavy white paper and the print dried overnight. A 2-inch by 8-inch strip was then cut from the print, coiled, and placed in a two-ounce bottle together with 50 grams of melted dairy wax. The bottle was then placed in an oven at 350° F. for ½ hour and the wax poured off into a clean bottle and examined visually while still melted. Only a very slight discoloration of the wax was seen when this procedure was used to evaluate the pigment of Example 1.

When this same testing procedure was applied to the commercially important Benzidine Yellows prepared by coupling tetrazotized 3,3'-dichlorobenzidine wtih acetoacet-o-toluidide and with acetoacet-o-anisidide, a strong coloration of the wax resulted. The coupling of diazotized 3-amino-4-methoxybenzanilide with acetoacet-o-anisidide and the coupling of two moles of diazotized 2,5-dichloroaniline with one mole of 4,4'-bi-o-acetoacetotoluidide were also evaluated by this same testing procedure, and in both cases a strong coloration of the wax again resulted.

Example 3

The pigment prepared in Example 1 was tested for bleed in lard oil by the following procedure:

Ten milligrams of the pigment were stirred in 100 milliliters of lard oil for two hours at 135° F. and the mixture then filtered through a 0.45 micron millipore filter. The percent transmittance of the filtrate was measured spectrophotometrically at the previously determined wavelength of maximum absorbance and found to be identical with that of pure lard oil, within the sensitivity of the spectrophotometer employed. Comparison of this result with extrapolated curves of concentration vs. percent transmittance prepared for azo pigments with similar absorption maxima and with roughly comparable tinting strengths when dispersed in various media indicates that the pigment of this invention probably has a solubility in lard oil of less than 0.1 part per million.

When this same testing procedure was applied to the commercially important Benzidine Yellows prepared by coupling tetrazotized 3,3'-dichlorobenzidine with acetoacet-o-toluidide and with acetoacet-o-anisidide, the lard oil filtrate had a measurable absorbance corresponding to a pigment solubility of approximately 0.8 part per million and 1.2 parts per million, respectively. The coupling of diazotized 3-amino-4-methoxybenzanilide with acetoacet-o-anisidide and the coupling of two moles of diazotized 2,5-dichloroaniline with one mole of 4,4'-bi-o-acetoacetotoluidide were also evaluated by this testing procedure and found to have lard oil solubilities of 8.3 parts per million and 1.0 part per million, respectively.

The exceptionally high bleed resistance of the pigment of this invention would not be expected on the basis of molecular weight, since three of the four comparison pigments cited in Examples 2 and 3 are of higher molecular weight. Neither would this exceptionally high bleed resistance be anticipated by structural analogy, since it will be noted that the comparison pigments of Examples 2 and 3 include one prepared from the same amine (3-amino-4-methoxybenzanilide) and one prepared from the same acetoacetarylide (4,4'-bi-o-acetoacetotoluidide) used in preparing the pigment of this invention.

The new pigment of this invention is of soft texture and has a desirable greenish-yellow hue. It has extraordinarily low solubility in organic media such as hot dairy wax and lard oil. This solubility is far less than that of commercially important Benzidine and Hansa Yellows.

The exceptionally high bleed resistance of this novel pigment makes it particularly desirable for use in inks for printing on containers, such as milk cartons, which are subsequently wax coated, and for printing on food wrappers which are to be waxed and heat sealed. This new compound also affords a means of pigmenting plastic films which are to be used in foodstuff packaging where the film will come in contact with foodstuffs, such as bread, containing organic substances which tend to dissolve quantities of many azo pigments sufficient to leave a perceptible strain on the foodstuff surface.

What I claim and desire to protect by Letters Patent is:
A compound having the formula:

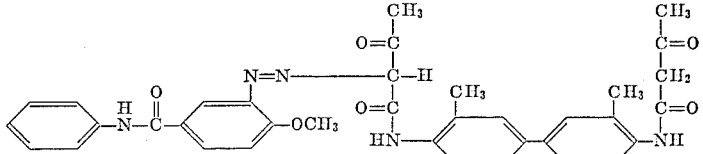

References Cited in the file of this patent
UNITED STATES PATENTS
1,505,568    Laska et al. _____ Aug. 19, 1924